(12) United States Patent
Matsuhira

(10) Patent No.: US 8,289,484 B2
(45) Date of Patent: Oct. 16, 2012

(54) DISPLAY DEVICE

(75) Inventor: Tsutomu Matsuhira, Chiba (JP); Tomoko Matsuhira, legal representative, Chiba (JP)

(73) Assignee: Seiko Instruments Inc. (JP)

( * ) Notice: Subject to any disclaimer, the term of this patent is extended or adjusted under 35 U.S.C. 154(b) by 249 days.

(21) Appl. No.: 12/449,271

(22) PCT Filed: Jan. 30, 2008

(86) PCT No.: PCT/JP2008/051362
§ 371 (c)(1),
(2), (4) Date: Sep. 25, 2009

(87) PCT Pub. No.: WO2008/093704
PCT Pub. Date: Aug. 7, 2008

(65) Prior Publication Data
US 2010/0014034 A1    Jan. 21, 2010

(30) Foreign Application Priority Data
Jan. 31, 2007 (JP) ................................. 2007-021324

(51) Int. Cl.
*G02F 1/1335* (2006.01)
*G02F 1/1337* (2006.01)

(52) U.S. Cl. ................... 349/122; 349/123; 349/124

(58) Field of Classification Search ........... 349/122–124
See application file for complete search history.

(56) References Cited

U.S. PATENT DOCUMENTS

| 5,808,715 | A * | 9/1998 | Tsai et al. ................... 349/122 |
| 7,688,418 | B2 * | 3/2010 | Tajima ........................ 349/187 |
| 7,800,702 | B2 * | 9/2010 | Tsuboi et al. ................... 349/1 |
| 7,887,910 | B2 * | 2/2011 | Kuramoto et al. ........... 428/323 |
| 8,049,860 | B2 * | 11/2011 | Ikadai et al. ................. 349/158 |
| 2001/0033275 | A1 * | 10/2001 | Kent et al. .................... 345/173 |
| 2002/0131141 | A1 | 9/2002 | Saitoh ......................... 359/245 |
| 2004/0113549 | A1 * | 6/2004 | Roberts et al. ............... 313/512 |
| 2004/0141141 | A1 * | 7/2004 | Ota et al. .................... 349/153 |
| 2005/0068488 | A1 * | 3/2005 | Tajima ........................ 349/190 |
| 2005/0170546 | A1 * | 8/2005 | Patel et al. .................... 438/48 |
| 2005/0174525 | A1 * | 8/2005 | Tsuboi et al. ................ 349/158 |
| 2007/0281126 | A1 * | 12/2007 | Lahann et al. ................ 428/98 |
| 2009/0046379 | A1 * | 2/2009 | Kuramoto et al. ........... 359/718 |
| 2009/0323008 | A1 * | 12/2009 | Ikadai et al. ................. 349/158 |

FOREIGN PATENT DOCUMENTS

| CN | 1693961 | | 11/2005 |
| CN | 1782807 | | 6/2006 |
| JP | 57052020 | A * | 3/1982 |
| JP | 2000347168 | | 12/2000 |
| JP | 2007114737 | | 5/2007 |
| JP | 2008111984 | A * | 5/2008 |

OTHER PUBLICATIONS

Abstract, publication No. CN2802543, publication date Aug. 2, 2006.

* cited by examiner

*Primary Examiner* — K. Cyrus Kianni
(74) *Attorney, Agent, or Firm* — Adams & Wilks

(57) ABSTRACT

To prevent a reduction in load resistance of a liquid crystal panel which is caused along with a reduction in thickness thereof, tempered glass is entirely bonded to both of front and back surfaces or one of the surfaces of the liquid crystal panel using an optical adhesive, and an amount of warp by which the liquid crystal panel alone is broken due to a pressure is set equal to or larger than that in a case of the tempered glass.

7 Claims, 1 Drawing Sheet

DISPLAY DEVICE

CROSS-REFERENCE TO RELATED APPLICATIONS

This application is a U.S. national stage application of International Application No. PCT/JP2008/051362 filed Jan. 30, 2008, claiming a priority date of Jan. 31, 2007, and published in a non-English language.

TECHNICAL FIELD

The present invention relates to a display device which is used in a portable device including a cellular phone, a PDA, or an electronic dictionary. In particular, the present invention relates to a technology of increasing strength of a liquid crystal panel manufactured with a thin glass substrate.

BACKGROUND ART

Due to growing demand for a reduction in thickness of a portable device such as a cellular phone, a reduction in thickness of glass of a liquid crystal panel has been attained up to 0.35 mm to 0.25 mm. In the cellular phone, a transparent plate such as a transparent touch panel or a transparent cover plate is bonded to a liquid crystal panel in some cases. There is known a method of entirely bonding a touch panel to a display panel using an optical adhesive (see JP 09-274536 A, for example).

In the structure described above, drop impact resistance of the liquid crystal panel is naturally increased to some extent. For the transparent cover plate, transparent plastic such as acrylic or polycarbonate, or glass is used. On a front surface of the transparent cover plate, there are often provided a low-reflective film formed by laminating materials having refractive indexes different in stages from one another, an electromagnetic shield which is made of copper or aluminum and has a grid-like etching pattern, and a hard coat for preventing scratches. In the case of glass, a film sheet may be bonded to a front surface thereof to prevent cracks, or a film sheet subjected to an anti-glare treatment may be bonded thereto to prevent specular reflection. Shapes of the transparent cover plate and a display element are quadrangle in most cases. As to the touch panel, there are known various types including an analog resistive touch panel, a digital resistive touch panel, a capacitance touch panel, and an ultrasonic touch panel.

Patent Document 1: JP 09-274536 A

SUMMARY OF THE INVENTION

With increasing degree of a reduction in thickness of a cellular phone, a thickness of glass of a liquid crystal panel has been reduced up to 0.35 mm to 0.25 mm. In a liquid crystal panel manufactured with thin glass, cracks frequently occur in the glass due to a drop impact or a weight of a pressure. An attempt has been made to take a countermeasure to prevent the cracks from occurring in the liquid crystal panel by changing a material for a case of a back light from plastic to the one having a higher Young's modulus such as magnesium. However, it has been unsuccessful to prevent the cracks due to an impact from occurring in the liquid crystal panel, particularly in the lower glass. In addition, studies have been conducted for a long time to change the glass substrate of a liquid crystal panel to a substrate made of plastic or a polymer film. However, reliability in a gas barrier to be formed on the plastic substrate or the film substrate has not been secured, and therefore, a liquid crystal panel having a plastic substrate or a film substrate as described above has not yet to be sold commonly in large volume.

On the other hand, the strength of the liquid crystal panel is increased with an aid of tempered glass which is bonded to a display surface of the liquid crystal panel. The tempered glass may increase the strength thereof particularly against an impact of a falling ball or the like, whereas there arises a problem that, when being applied with a weight of a pressure, the liquid crystal panel is broken before the tempered glass is broken.

Here, the above-mentioned problem is solved by the following manner. In a structure in which a transparent plate is entirely bonded via an optical adhesive layer to at least one of a front surface and a back surface of a liquid crystal panel in which liquid crystals are held between two transparent substrates, an amount of warp by which the liquid crystal panel alone is broken due to a pressure is set equal to or larger than an amount of warp by which the transparent plate alone is broken due to the pressure. More specifically, the transparent substrates of the liquid crystal panel are further reduced in thickness. With this structure, when being applied with a load, the transparent plate is broken before or simultaneously with breakage of the liquid crystal panel. Another transparent plate may be further entirely bonded to the transparent plate via an optical adhesive layer in order to further increase the load resistance.

According to the liquid crystal display device with the above-mentioned structure, it is possible to provide a liquid crystal display device in which the glass of the liquid crystal panel may be reduced in thickness and which is high in strength. Further, as the transparent plate, thin tempered glass is bonded to the liquid crystal panel via the optical adhesive layer by lamination, which enables to increase the load resistance. The structure described above is applicable not only to the liquid crystal panel but also to other display panels.

Figure 1:
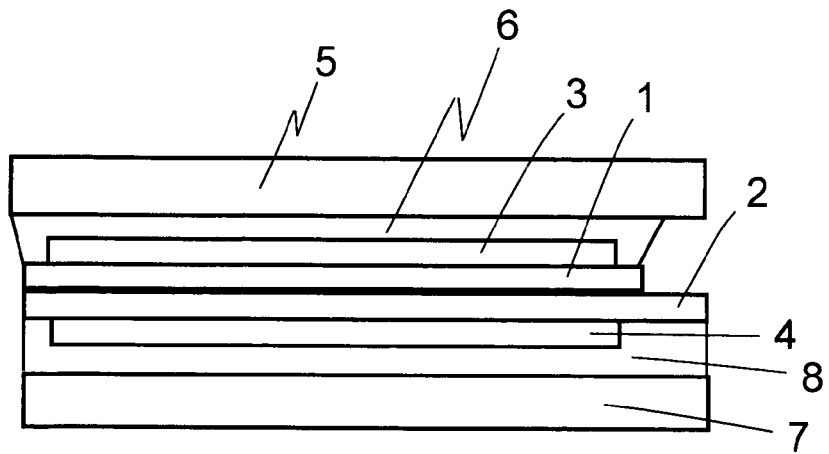
FIG. 1 is a schematic view illustrating a structure according to a first embodiment in which tempered glass is entirely bonded to a liquid crystal panel.

DESCRIPTION OF SYMBOLS 1 transparent substrate
2 opposing transparent substrate
3 upper polarizing plate
4 lower polarizing plate
5 tempered glass on display surface side
6 optical adhesive
7 tempered glass on back surface side
8 optical adhesive
9 sapphire
10 optical adhesive
11 tempered glass having satin finished surface

DETAILED DESCRIPTION OF THE INVENTION

A display device according to the present invention includes: a display panel including transparent substrates;

and a transparent plate bonded to at least one of a front surface and a back surface of the display panel via an optical adhesive layer, in which an amount of warp by which the display panel alone is broken due to a pressure is set equal to or larger than an amount of warp by which the transparent plate alone is broken due to the pressure. Therefore, each of the transparent substrates constituting the display panel is reduced in thickness to increase the amount of warp by which the display panel is broken.

Further, there may be employed another structure in which another transparent plate is further provided above the transparent plate via an optical adhesive layer. Alternatively, a first transparent plate and a second transparent plate may be bonded to the front surface and the back surface of the display panel via the optical adhesive layer, respectively. In this case, the optical adhesive layer for bonding the second transparent plate to the back surface of the display panel is set larger in thickness than the optical adhesive layer for bonding the first transparent plate to the front surface of the display panel.

Further, in a case where the display panel is of a non-self light emission type, the transparent plate which is bonded to a back surface side of the display panel is provided with diffusion characteristics. In addition, in a case where the display panel includes two transparent substrates, glass substrates each having a thickness of 0.1 mm are used as the transparent substrates.

Further, the transparent plate is made of tempered glass having a thickness of 0.5 mm or larger. In addition, sapphire glass of about 0.3 mm may be entirely bonded to the transparent plate using an optical adhesive.

As the optical adhesive layer for entirely bonding the transparent plate to the display panel, there may be exemplified an optical adhesive and an optical adhesive sheet.

Embodiments in which a liquid crystal panel is used as the display panel are described below. As a pair of transparent substrates which constitute the liquid crystal panel, glass substrates each having a thickness of about 0.1 mm are used. An optical film such as a polarizing plate is bonded to each of the transparent substrates. Tempered glass of 0.5 mm is entirely bonded on a front surface side of the liquid crystal panel via an optical adhesive layer. Also on a back surface side of the liquid crystal panel, tempered glass of about 0.5 mm may be entirely bonded via an optical adhesive layer. Further, sapphire glass of about 0.3 mm may be further entirely bonded via an optical adhesive layer to the tempered glass provided on the front surface side.

First Embodiment

FIG. 1 schematically illustrates a cross-sectional structure according to a first embodiment. A liquid crystal panel has a structure in which a liquid crystal layer is held in a gap between a transparent substrate 1 provided on a display surface side and an opposing transparent substrate 2 provided on a back surface side. On the transparent substrate 1, a color filter and a transparent electrode are formed. On the opposing transparent substrate 2, a TFT array is formed. A drive signal is output from a driver IC (not shown) to drive the liquid crystals. Light for which its vibration direction is selected at an upper polarizing plate 3 bonded to the transparent substrate 1 on the display surface side and a lower polarizing plate 4 bonded to the opposing transparent substrate 2 on the back surface side is incident from a back light (not shown). The vibration direction of the light is changed in the liquid crystal layer. Display is performed based on whether the upper polarizing plate 3 transmits or absorbs the light. In this case, glass substrates each having a thickness of 0.1 mm are used for the transparent substrate 1 and the opposing transparent substrate 2.

As illustrated in FIG. 1, tempered glass 5 of 0.5 mm is bonded and fixed to a front surface of the liquid crystal panel using an optical adhesive 6. The optical adhesive 6 is about 50 µm in thickness. Further, to a back surface of the liquid crystal panel, tempered glass 7 of 0.5 mm is also bonded using an optical adhesive 8. A thickness of the optical adhesive provided on the back surface side is about 100 µm.

According to a three-point bending test with intervals of 36 mm, tempered glass having a thickness of 0.5 mm is warped by about 2.5 mm to be broken at a force of about 100 N. In the same test, a liquid crystal panel which uses non-alkali glass having a thickness of 0.35 mm is warped by about 1 mm to be broken at a force of about 40 N. Even when the above-mentioned tempered glass is respectively bonded to the front and back surfaces of the liquid crystal panel using optical adhesives so as to sandwich the liquid crystal panel, the liquid crystal panel is warped by about 1 mm to be broken. However, the tempered glass is not broken at that time. A breaking load in this case is about 150 N. In the case of the liquid crystal panel which uses non-alkali glass having a thickness of 0.1 mm of this embodiment, the liquid crystal panel is warped by about 3 mm to be broken. Accordingly, in the structure in which the tempered glass is respectively bonded to the front and back surfaces of the liquid crystal panel using the optical adhesives so as to sandwich the liquid crystal panel, when being pressed and bent, the tempered glass is broken before the liquid crystal panel is broken. Breaking strength in this case is about 220 N, which means the strength of the liquid crystal panel is increased. When the glass of the liquid crystal panel is thinned, the strength of the liquid crystal panel is reduced correspondingly, but the liquid crystal panel may bear a load up to the breaking load of the tempered glass.

Further, each of the glass substrates of the liquid crystal panel is reduced in thickness to 0.1 mm from a conventional thickness of 0.35 mm. As a result, in addition to the increased strength, a reduction in thickness by 0.5 mm is achieved correspondingly to the thicknesses of the glass provided on the front and back surfaces. In this embodiment, the tempered glass is used as the transparent plate, but the tempered glass may be substituted with acrylic (PMMA), polycarbonate (PC), non-alkali glass, soda-lime glass, chemical tempered glass in which Na and K of soda lime are substituted for each other, air-cooled tempered glass, quartz, or sapphire.

Second Embodiment

Figure 2:
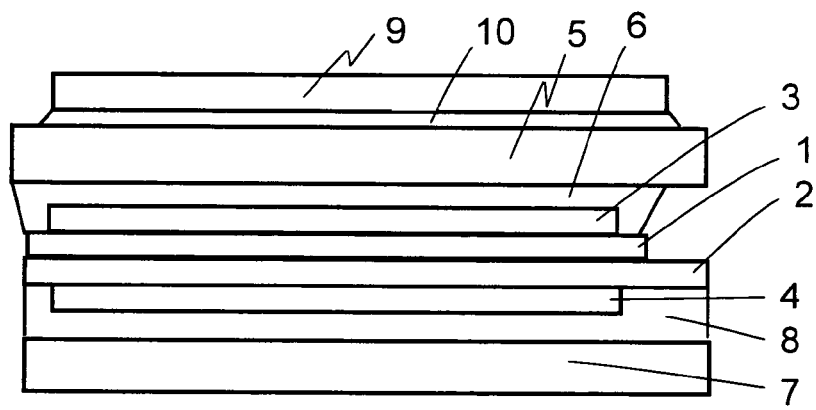
FIG. 2 is a schematic view illustrating a structure according to a second embodiment in which tempered glass and sapphire are entirely bonded to a liquid crystal panel.

FIG. 2 schematically illustrates a cross-sectional structure of a display device according to a second embodiment. The second embodiment employs a structure in which sapphire 9 having a thickness of 0.3 mm is further bonded using an optical adhesive 10 to the tempered glass 5 provided on the display surface side of the display device according to the first embodiment. A refractive index of sapphire is 1.76, which is larger compared with 1.54 of glass. For this reason, in view of transmittance, it is preferable that an AR film formed by sputtering a material having a lowered refractive index be formed on a surface of the sapphire, or alternatively that a refractive index of the optical adhesive 10 be set to an intermediate level between those of sapphire and glass.

Sapphire has a higher Young's modulus than that of soda-lime glass, and therefore is resistant to cracks even when being thinned. According to a falling ball test, the same strength characteristics are obtained between the case where tempered glass having a thickness of 0.3 mm is bonded using an optical adhesive and the case where no tempered glass is bonded. For this reason, in a case of using tempered glass, it is desirable that tempered glass having a thickness of 0.5 mm or larger be bonded using the optical adhesive. Therefore, in a case of bonding a plate having a thickness of less than 0.5 mm, sapphire is desirably used therefor.

In this embodiment, sapphire is bonded, but sapphire may be substituted with any one of acrylic (PMMA), polycarbonate (PC), non-alkali glass, soda-lime glass, chemical tempered glass in which Na and K of soda lime are substituted for each other, air-cooled tempered glass, and quartz.

Besides, the transparent plate may be bonded to the back surface of the liquid crystal panel in addition to the front surface thereof. Further, no limitation is placed on the number of the transparent plates to be bonded to one surface of the liquid crystal panel.

Third Embodiment

Figure 3:
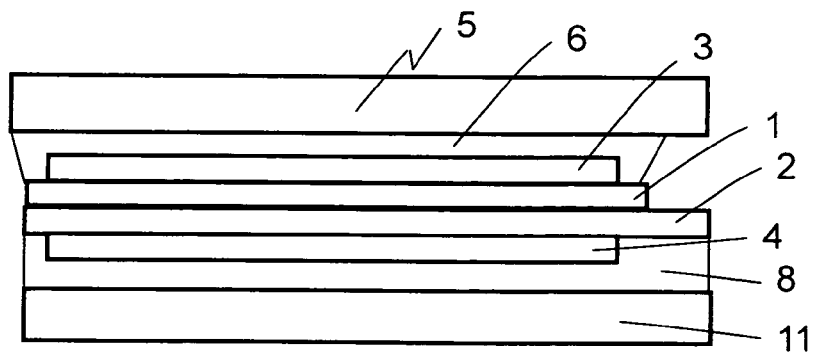
FIG. 3 is a schematic view illustrating a structure according to a third embodiment in which tempered glass is entirely bonded to a liquid crystal panel.

FIG. 3 schematically illustrates a cross-sectional structure of a display device according to a third embodiment. The third embodiment employs a structure in which tempered glass 11 having a satin finished surface is used on the back surface side of the display device according to the first embodiment. In a structure in which a back light is provided behind a liquid crystal panel to illuminate the liquid crystal panel, the back light includes a light guide plate and a light source, and light from the LED light source is introduced from a side surface of the light guide plate to achieve surface emission by means of a reflection pattern formed on a front surface of the light guide plate. In this case, in order to increase luminance, two prism sheets each having lenses continuously formed thereon in one direction are arranged on an emission surface so that the directions of the lenses are orthogonal to each other, and conventionally, a diffusion plate is further arranged thereon. As in this embodiment, when the tempered glass 11 having the satin finished surface is used, the diffusion plate becomes unnecessary, thereby enabling a further reduction in thickness. In general, a thickness of the diffusion plate is about 60 μm to 100 μm.

INDUSTRIAL APPLICABILITY

According to the present invention, a reduction in thickness and an increase in strength of the display device are realized at the same time. Therefore, the present invention is applicable to a display device to be used in a portable device.

The invention claimed is:

1. A display device, comprising:
a display panel including opposed transparent glass substrates each having a thickness of 0.1 mm;
a first transparent plate bonded to at least one of a front surface and a back surface of the display panel via an optical adhesive layer; and
a second transparent plate bonded to the first transparent plate via an optical adhesive layer,
wherein the first transparent plate comprises tempered glass having a thickness of 0.5 mm or larger, and
wherein an amount of warp by which the display panel alone is broken due to a pressure applied thereto is equal to or larger than an amount of warp by which the first transparent plate alone is broken due to a pressure applied thereto.

2. A display device, comprising:
a display panel including opposed transparent glass substrates each having a thickness of 0.1 mm;
a first transparent plate bonded to a front surface of the display panel via an optical adhesive layer; and
a second transparent plate bonded to a back surface of the display panel via an optical adhesive layer,
wherein the first and second transparent plates each comprises tempered glass having a thickness of 0.5 mm or larger,
wherein the optical adhesive layer for bonding the second transparent plate to the back surface of the display panel is larger in thickness than the optical adhesive layer for bonding the first transparent plate to the front surface of the display panel, and
wherein an amount of warp by which the display panel alone is broken due to a pressure applied thereto is equal to or larger than an amount of warp by which the first transparent plate alone is broken due to a pressure applied thereto.

3. A display device, comprising:
a display panel including opposed transparent glass substrates each having a thickness of 0.1 mm;
a first transparent plate bonded to a front surface of the display panel via an optical adhesive layer; and
a second transparent plate bonded to a back surface of the display panel via an optical adhesive layer,
wherein the first transparent plate has a thickness of 0.5 mm or larger and is comprised of tempered glass,
wherein the second transparent plate has a thickness of 0.5 mm or larger and is comprised of glass, acrylic (PMMA), polycarbonate, quartz or sapphire, and
wherein an amount of warp by which the display panel alone is broken due to a pressure applied thereto is equal to or larger than an amount of warp by which the first transparent plate alone is broken due to a pressure applied thereto.

4. A display device according to claim 3, wherein:
the display panel comprises a non-self light emission type display panel; and
the second transparent plate which is bonded to the back surface of the display panel has diffusion characteristics.

5. A display device according to claim 4, wherein the transparent substrates comprise two glass substrates each having a thickness of 0.1 mm.

6. A display device according to claim 5, wherein each transparent plate comprises tempered glass having a thickness of 0.5 mm or larger.

7. A display device according to claim 3; wherein both the first and second transparent plates are comprised of tempered glass.

* * * * *